United States Patent [19]

Bournonville et al.

[11] Patent Number: 4,480,048

[45] Date of Patent: Oct. 30, 1984

[54] CATALYSTS FOR HYDROCARBONS CONVERSION

[75] Inventors: Jean-Paul Bournonville, Chatou; Jean Miquel, Paris, both of France

[73] Assignee: Societe Francaise des Produits Pour Catalyse Pro-Catalyse chez Institute Francais Du Petrole, Reil-Maloison, France

[21] Appl. No.: 497,632

[22] Filed: May 24, 1983

[30] Foreign Application Priority Data

May 24, 1982 [FR] France .................. 82 09098

[51] Int. Cl.$^3$ .................. B01J 27/10; C10G 35/085
[52] U.S. Cl. .................. 502/227; 208/139
[58] Field of Search .................. 502/227; 208/139

[56] References Cited

U.S. PATENT DOCUMENTS

| | | | |
|---|---|---|---|
| 3,691,064 | 9/1972 | Hays et al. .................. | 208/139 |
| 3,957,686 | 5/1976 | Duhaut et al. .................. | 208/139 |
| 3,968,025 | 7/1976 | Holm .................. | 208/139 |
| 4,111,841 | 9/1978 | Weisang et al. .................. | 502/227 |
| 4,116,870 | 9/1978 | Weisang et al. .................. | 502/227 |
| 4,197,188 | 4/1980 | Antos .................. | 502/227 |

Primary Examiner—Delbert E. Gantz
Assistant Examiner—Chung K. Pak
Attorney, Agent, or Firm—Millen & White

[57] ABSTRACT

New catalysts, useful for performing hydrocarbons conversions such as reforming, production of aromatics, isomerization of paraffinic and aromatic hydrocarbons, hydrocracking, hydrodealkylation and steam-dealkylation, are formed of a carrier such as alumina and active elements comprising a noble metal of the platinum family, titanium, at least one metal selected from manganese, technetium and rhenium, and halogen, said catalysts being advantageously used as a moving bed.

11 Claims, No Drawings

CATALYSTS FOR HYDROCARBONS CONVERSION

The invention concerns new catalysts for hydrocarbons conversion.

These catalysts comprise a carrier, a noble metal of the platinum family, titanium, a metal selected from manganese, technetium and rhenium and halogen or a halogen compound.

They are used particularly in a catalytic reforming process as well as in a catalytic process for manufacturing aromatic hydrocarbons, said processes being operated, for example, at a temperature from 430° to 600° C., under an absolute pressure from 0.1 to 3.5 MPa, at an hourly velocity comprised between 0.1 and 10 volumes of liquid charge per volume of catalyst, the molar ratio hydrogen/hydrocarbons ranging from 1 to 20. The catalysts according to the invention are particularly useful for carrying out these two processes under severe conditions. Thus, these new catalysts are useful for:

reforming reactions in order to obtain gasoline having a clear octane number higher than or at least equal to 102. The severe conditions of catalytic hydroreforming reactions are particularly the following: average temperature from about 510° to 580° C., pressure ranging between about 0.5 and 1.8 MPa, preferably 0.6 to 1.3 MPa, hourly velocity comprised between 1 and 10 volumes of liquid charge per volume of catalyst and hydrogen/hydrocarbons molar ratio from 3 to 10. The charge is generally a naphtha distilling between about 60° C. and about 220° C., in particular a straight run naphtha, reactions producing aromatic hydrocarbons from unsaturated or saturated gasolines (for producing benzene, toluene or xylenes). In the case of an unsaturated charge, i.e. a charge containing diolefins and monoolefins, the latter must be first made free thereof by selective or total hydrogenation.

Then, the charge, optionally made free by hydrogenation of substantially all its diolefins and monoolefins, if any, is subjected to a treatment with hydrogen, in the presence of a catalyst, at a temperature comprised between about 530° and 600° C., under a pressure comprised between 0.1 and 1.3 MPa, the hourly volume feed rate of the liquid charge being of the order of 1 to 10 times the catalyst volume, the molar ratio hydrogen/hydrocarbons being of the order of 3 to 10. The feed charge may consist of pyrolysis, cracking and particularly steam-cracking or catalytic reforming gasolines, or may be constituted of naphthenic hydrocarbons convertible by dehydrogenation to aromatic hydrocarbons.

The catalysts according to the invention are also convenient for hydrocracking reactions which are generally performed at a temperature ranging from about 260° to 530° C. and under a pressure from about 0.5 to 25 MPa. The conversion conditions comprise an hourly space velocity of the liquid or VSHL, or volume per hour of liquid charge at 15° C. per volume of catalyst, ranging from about 0.1 to 10.0, having preferably about 0.4 as upper limit and a hydrogen flow rate of about 1 to 20 moles/mole of charge.

The catalysts according to the invention are also convenient for the isomerization of aromatic hydrocarbons (e.g. xylenes) which reactions are usually performed at a temperature from about 200° to 600° C., under a pressure from about 0.005 to 7 MPa, the hourly flow rate by volume being from 0.1 to 10 times the catalyst volume.

The catalysts according to the invention are further convenient for isomerizing, under hydrogen atmosphere, saturated hydrocarbons comprising 4 to 7 carbon atoms, at a temperature from 50° to 250° C., e.g., 100°-200° C. The operation is preferably conducted under a pressure from 0.5 to 10 MPa and with a space velocity from 0.2 to 10 liters of charge per liter of catalyst and per hour. The molar ratio $H_2$/hydrocarbon is comprised, for example, between 0.01:1 and 20:1.

The catalysts according to the invention are also convenient for the reactions of aromatic hydrocarbons hydrodealkylation or aromatic hydrocarbons steam-dealkylation, said reactions being performed under known operating conditions, generally between 300° and 600° C. so as to produce, for example, benzene from toluene or from other alkylbenzenes.

The catalysts may be used as a moving bed, particularly for the reactions of reforming and aromatic hydrocarbons production, which reactions are preferably conducted in a series of moving bed reactors.

The feed charge successively passes through each reactor or reaction zone by axially or radially flowing therethrough (the radial flow consisitng of a flow from the center towards the periphery or from the periphery towards the center). The reaction zones are serially arranged, for example side by side or superposed. Preferably, the reaction zones are placed side by side. The feed charge successively flows through each of these reaction zones, with the provision of an intermediary heating of the charge between the reaction zones; the fresh catalyst is introduced at the top of the first reaction zone where the fresh charge is introduced; it then progressively flows downwardly through said zone and is progressively withdrawn at the bottom thereof and by any convenient means (in particular a lift in the case of side by side arranged reactors) it is conveyed to the top of the next reaction zone wherethrough it also progressively flows downwardly, and so on to the last reaction zone at the bottom of which the catalyst is also progressively withdrawn to be fed to a regeneration zone. At the output of the regeneration zone, the catalyst is fed back progressively to the top of the first reaction zone. The various catalyst withdrawals are effected "progressively" as above mentioned, i.e. either periodically or continuously. The continuous withdrawals are preferred to the periodic withdrawals.

Catalysts containing a metal of the platinum family deposited on a carrier have been well known for a long time. However, in spite of the numerous improvements to these catalysts, for example by incorporating thereto one, two or even three other metals selected from the most various groups of the periodic classification of elements, it is still worth the effort to find new catalysts which, on the one hand would give still better yields than those obtained up to now and which, on the other hand, would also have a longer life time than that of the known catalysts. In addition, efforts are made to improve the mechanical properties of these catalysts in order particularly to make possible their use as a moving bed of conglomerates, for example balls or extrudates of a substantial size, so as to leave a relatively easy passage to the gaseous reactants. The wear of these catalysts results in the formation of much smaller particles which progressively obstruct the free space and make it necessary to increase the input pressure of the reactants or even to discontinue the operation.

Now, new specific catalysts have been discovered which have an increased activity and, overall, an increased life time as compared to the prior art catalysts.

The specific catalyst used according to the present invention contains a carrier, a noble metal of the platinum family, titanium, a third metal selected from manganese, technetium and rhenium and halogen, for example chlorine or fluorine. The preferred noble metals of the platinum family are platinum, rhodium and iridium. The preferred third metal is manganese or technetium.

The catalyst according to the invention contains, by weight with respect to the carrier: (a) 0.05 to 0.6% and more particularly 0.1 to 0.5% of a noble metal of the platinum family, (b) 0.005 to 5%, preferably 0.05 to 3% and more particularly 0.4 to 1% of titanium, (c) 0.005 to 3%, preferably 0.07 to 2% and more particularly 0.2 to 0.5% of manganese, technetium and/or rhenium and (d) 0.1 to 15% by weight, with respect to the carrier, of halogen, for example chlorine or fluorine.

The carriers are generally selected from the oxides of metals from groups II, III and/or IV of the periodic classification of elements, such for example as the oxides of magnesium, aluminum, titanium, zirconium, thorium or silicon, either taken separately or in admixture therebetween or with oxides of other elements of the periodic classification, such for example as boron and/or antimony. Coal may also be used. It is also possible to make use of zeolites or molecular sieves of the X or Y types, of the mordenite or faujasite type or of the type ZMS-5, ZMS-4, ZMS-8, etc. as well as mixtures of oxides of metals from groups II, III and/or IV with a zeolitic material.

For the reactions of reforming or aromatic hydrocarbon production and for the reactions of paraffinic or aromatic hydrocarbons isomerization, the preferred carrier is alumina, advantageously of a specific surface ranging from 50 to 400 m² per gram, preferably from 100 to 300 m²/g.

The catalyst may be prepared according to the conventional methods consisting of impregnating the carrier by means of solutions of the metal compounds to be introduced. There can be used either a common solution of these metals or separate solutions of each metal. When using several solutions, intermediary drying and/or roasting steps may be preformed. Usually a final calcination is effected, for example between about 500° and 1000° C., preferably in the presence of free oxygen, for example by air scavenging.

As examples of metal compounds included in the catalyst composition, there can be mentioned for example the nitrates, the chlorides, the bromides, the fluorides, the sulfates, the ammonium salts or the acetates of these metals or even any other salt or oxide of these metals soluble in water, in hydrochloric acid or in any other convenient solvent.

The halogen of the catalyst may be supplied by one of the metals halides, when introducing the metal as a halide, or it may be introduced in the form of hydrochloric acid or hydrofluoric acid, of ammonium chloride, ammonium fluoride, chlorine gas or a hydrocarbon halide, for example $CCl_4$, $CH_2Cl_2$ or $CH_3Cl$, etc.

A method of preparation consists, for example, of impregnating the carrier by means of an aqueous solution of, for example, titanium nitrate or another titanium compound, drying at about 120° C. and roasting in air for a few hours at a temperature comprised between 500° and 1000° C.; and effecting thereafter a second impregnation by means of a solution containing the metal of the platinum family and the third metal selected from manganese, technetium and rhenium.

Another method consists, for example, of impregnating the carrier by means of a solution containing simultaneously the three catalyst metals.

Still another method consists of introducing the metal elements by effecting a number of successive impregnations corresponding to the number of metal elements in the catalyst.

An important application of the invention consists of producing gasoline of very high octane number, requiring an operation under very severe conditions that the presently used catalysts difficulty withstand. The use of bimetallic catalysts has however resulted in a clear improvement. Numerous attempts of metals associations have been made and even recently catalytic compositions containing up to 4 and even 5 metals have been proposed. These compositions are effectively responsible for an improvement but, generally, whereas the used promoters bring new favorable stability properties, they unhappily are also responsible, particularly in the case of noble metals of the platinum family, for a certain tendency to hydrogenolysis, leading finally to a decrease in the yields and a shortening of the cycle period and of the number of possible cycles, i.e. finally a decrease of the catalyst life time.

It has been observed that the simultaneous use of titanium and manganese, technetium and/or rhenium jointly with a noble metal of the platinum family, very substantially attenuates this phenomenon by substantially decreasing this hydrogenolysis tendency, and it has been observed that the advantages obtained by each of the three metals are optimum in the case of severe operating conditions, particularly when using low pressures, high temperatures and long operating times.

The following examples illustrates the invention without however limiting the scope thereof.

EXAMPLE 1

In order to obtain gasoline having a clear octane number of 103, there is used as feed charge a naphtha having the following characteristics:

| | |
|---|---|
| ASTM distillation | 80–160° C. |
| Composition: aromatic hydrocarbons | 7% by weight |
| naphthenic hydrocarbons | 27% by weight |
| paraffinic hydrocarbons | 66% by weight |
| "Clear research" octane number | about 37 |
| Average molecular weight | 110 |
| Specific gravity at 20° C. | 0.782 |

This naphtha passes with recycled hydrogen over two catalysts A and B containing 0.4% of platinum and 0.5% of titanium by weight, with respect to the carrier which consists of alumina having a surface of 240 m²/g and a pore volume of 0.58 cc/g; the chlorine content of catalysts A and B is 1.12%. Catalyst A further contains 0.3% by weight of manganese and catalyst B further contains 0.3% by weight of technetium.

The catalysts A and B have been prepared by adding to 100 g of alumina 100 cc of an aqueous solution containing:

1.90 g of concentrated HCl (d=1.19),
20 g of an aqueous solution of chloroplatinic acid with a 2% by weight platinum content,
10 g of an aqueous solution containing 5% by weight of titanium as titanium trichloride, and 1.57 g of manganese nitrate Mn(NO$_3$)$_2$6H$_2$O for catalyst A or 30 ml of a solution containing 0.61 g of (NH$_4$)$_2$TcO$_4$ for catalyst B.

After 5 hours of contact, the product is dried for 2 hours at 100° C., then roasted at 500° C. under scavenging with dry air (10 l/hour of air dried by passage though a bed of activated alumina). Then reduction is performed with a dry hydrogen stream (5 l/hour and passage over activated alumina) for 2 hours at 450° C.

The obtained catalysts A and B contain (by weight):
0.4% of platinum
0.5% of titanium
0.3% of manganese (catalyst A), or
0.3% of technetium (catalyst B), and
1.12% of chlorine.

These obtained catalysts A and B have a specific surface of 230 m$^2$/g and a pore volume of 0.55 cc/g.

The operation is conducted in a continuous manner, with a moving bed, in 3 reactors of substantially identical volumes.

The operating conditions are as follows:

| | |
|---|---|
| pressure | 1 MPa |
| temperature | 530° C. |
| molar ratio H$_2$/hydrocarbons | 8 |
| hourly flow rate of liquid charge | 2 times the catalyst volume. |

The operation is also conducted with a catalyst Q, according to the invention, containing, by weight, 1.12% of chlorine, 0.4% of platinum, 0.5% of titanium and 0.3% of rhenium.

Various catalysts of the prior art not conforming with the invention, comprising 1, 2 or 3 metal elements are also used. All of these catalysts also contain 1.12% of chlorine.

Table I below indicates the C$_5^+$ yield obtained and the hydrogen percent contained in the recycle gas after 200 hours.

The results obtained in this example 1, making use of the catalysts according to the invention, may be maintained over time, i.e. over very long periods, for example of several months, by operating as indicated, i.e. continuously, with a system of 3 moving bed reactors, the catalyst being withdrawn for example continuously at a rate so adjusted that the whole catalyst bed of the reactor is progressively renewed with fresh catalyst for example in about 500 hours.

TABLE I

| CATA-LYST | METAL % WITH RESPECT TO THE CATALYST CARRIER | | | YIELD OF C$_5^+$ (b.w.) | RECYCLE GAS % H$_2$ MOLAR |
|---|---|---|---|---|---|
| A | 0.4 platinum | 0.5 titanium | 0.3 Manganese | 80.2 | 79.5 |
| F | 0.4 platinum | — | — | 73.4 | 72.9 |
| C | 0.4 platinum | 0.5 titanium | — | 76.7 | 76.2 |
| D | 0.4 platinum | — | 0.3 Manganese | 77.9 | 77.6 |
| B | 0.4 platinum | 0.5 titanium | 0.3 Technetium | 80.2 | 79.7 |
| E | 0.4 platinum | — | 0.3 Technetium | 74.9 | 74.5 |
| G | 0.4 platinum | 0.2 iridium | 0.3 Manganese | 79.7 | 78.3 |
| H | 0.4 platinum | 0.08 iridium | 0.3 Manganese | 79.7 | 78.4 |
| I | 0.4 platinum | 0.2 iridium | 0.3 Technetium | 79.3 | 78.8 |
| J | 0.4 platinum | 0.08 iridium | 0.3 Technetium | 79.3 | 78.8 |
| K | 0.4 platinum | 0.08 iridium | — | 75.2 | 74.9 |
| L | 0.4 platinum | 0.08 ruthenium | — | 75.1 | 74.9 |
| M | 0.4 platinum | 0.2 ruthenium | — | 75.1 | 74.7 |
| N | 0.4 platinum | 0.08 ruthenium | 0.3 Manganese | 79.6 | 78.8 |
| O | 0.4 platinum | — | 0.5 Manganese | 77.9 | 77.5 |
| P | 0.4 platinum | — | 0.3 Rhenium | 76.7 | 76.2 |
| Q | 0.4 platinum | 0.5 titanium | 0.3 Rhenium | 80.2 | 79.7 |

EXAMPLE 2

Example 1 is repeated with the use of catalysts containing platinum, titanium, manganese or technetium, while varying the titanium, manganese or technetium content.

The metal contents and the obtained results are reported in Table II: All of these catalysts contain 1.12% of chlorine.

TABLE II

| CATA-LYST | METAL % WITH RESPECT TO THE CATALYST CARRIER | | | YIELD OF C$_5^+$ (b.w.) | RECYCLE GAS % H$_2$ MOLAR |
|---|---|---|---|---|---|
| A$_1$ | 0.4 platinum | 0.5 titanium | 0.003 manganese | 76.7 | 76.2 |
| A$_2$ | 0.4 platinum | 0.5 titanium | 0.03 manganese | 79.9 | 78.5 |
| A$_3$ | 0.4 platinum | 0.5 titanium | 0.10 manganese | 80.1 | 79.3 |
| A | 0.4 platinum | 0.5 titanium | 0.3 manganese | 80.2 | 79.5 |
| A$_4$ | 0.4 platinum | 0.5 titanium | 1.0 manganese | 80.0 | 79.3 |
| A$_5$ | 0.4 platnium | 0.5 titanium | 2.5 manganese | 79.5 | 78.6 |
| A$_6$ | 0.4 platinum | 0.5 titanium | 4 manganese | 76.2 | 75.9 |
| B$_1$ | 0.4 platinum | 0.5 titanium | 0.003 technetium | 76.7 | 76.2 |
| B$_2$ | 0.4 platinum | 0.5 titanium | 0.03 technetium | 79.5 | 79.0 |
| B$_3$ | 0.4 platinum | 0.5 titanium | 0.1 technetium | 80.0 | 79.5 |
| B | 0.4 platinum | 0.5 titanium | 0.3 technetium | 80.1 | 79.7 |
| B$_4$ | 0.4 platinum | 0.5 titanium | 1.0 technetium | 79.9 | 79.4 |
| B$_5$ | 0.4 platinum | 0.5 titanium | 2.5 technetium | 79.4 | 78.9 |
| B$_6$ | 0.4 platinum | 0.5 titanium | 4 technetium | 76.0 | 75.6 |
| Q$_1$ | 0.4 platinum | 0.5 titanium | 0.003 rhenium | 76.6 | 76.3 |
| Q$_2$ | 0.4 platinum | 0.5 titanium | 0.03 rhenium | 79.4 | 78.7 |
| Q$_3$ | 0.4 platinum | 0.5 titanium | 0.10 rhenium | 80.0 | 79.4 |

TABLE II-continued

| CATA-LYST | METAL % WITH RESPECT TO THE CATALYST CARRIER | | | YIELD OF $C_5^+$ (b.w.) | RECYCLE GAS % $H_2$ MOLAR |
|---|---|---|---|---|---|
| Q | 0.4 platinum | 0.5 titanium | 0.3 rhenium | 80.1 | 79.7 |
| $Q_4$ | 0.4 platinum | 0.5 titanium | 1.0 rhenium | 79.9 | 79.4 |
| $Q_5$ | 0.4 platinum | 0.5 titanium | 2.5 rhenium | 79.4 | 78.7 |
| $Q_6$ | 0.4 platinum | 0.5 titanium | 4.0 rhenium | 75.9 | 75.8 |
| $R_1$ | 0.4 platinum | 0.003 titanium | 0.3 manganese | 77.9 | 77.6 |
| $R_2$ | 0.4 platinum | 0.003 titanium | 0.3 technetium | 76.9 | 76.5 |
| $R_3$ | 0.4 platinum | 0.003 titanium | 0.3 rhenium | 77.2 | 77.8 |
| $R_4$ | 0.4 platinum | 0.01 titanium | 0.3 manganese | 79.8 | 78.4 |
| $R_5$ | 0.4 platinum | 0.01 titanium | 0.3 technetium | 79.4 | 78.8 |
| $R_6$ | 0.4 platinum | 0.01 titanium | 0.3 rhenium | 79.6 | 78.9 |
| $R_7$ | 0.4 platinum | 0.2 titanium | 0.3 manganese | 80.0 | 79.2 |
| $R_8$ | 0.4 platinum | 0.2 titanium | 0.3 technetium | 79.8 | 79.2 |
| $R_9$ | 0.4 platinum | 0.2 titanium | 0.3 rhenium | 79.7 | 79.1 |
| $R_{10}$ | 0.4 platinum | 2.0 titanium | 0.3 manganese | 80.0 | 79.2 |
| $R_{11}$ | 0.4 platinum | 2.0 titanium | 0.3 technetium | 79.7 | 79.2 |
| $R_{12}$ | 0.4 platinum | 2.0 titanium | 0.3 rhenium | 79.6 | 79.0 |

EXAMPLE 3

Catalysts A and B are prepared in example 1, are used in a process for producing aromatic hydrocarbons.

The feed charge, passed with hydrogen over these two catalysts, has the following composition by weight:

| | |
|---|---|
| isopentane + n.pentane | 1.59% |
| isohexanes + n.hexane | 24.22% |
| isoheptanes + n.heptane | 42.55% |
| cyclopentane | 0.13% |
| methylcyclopentane | 6.72% |
| cyclohexane | 5.50% |
| $C_7$ naphthenes | 15.81% |
| $C_8$ naphthenes | 0.14% |
| benzene | 1.68% |
| toluene | 1.66% |
| TOTAL | 100.00% |

The operating conditions were as follows:

| | |
|---|---|
| pressure | 1 MPa |
| temperature | 550° C. |
| hourly flow rate of liquid feed charge | 3 times the catalyst volume |
| molar ratio hydrogen/feed charge | 6 |

The results are reported in Table III where are indicated, in relation with the catalyst age, the contents by weight of benzene, toluene, benzene+toluene, as a proportion of the initial charge, as well as the $C_5^+$ yield by weight.

TABLE III

| CATA-LYST | BY WEIGHT COMPOSITION of the PRODUCT | AGE OF THE CATALYST IN HOURS | | |
|---|---|---|---|---|
| | | 30 HOURS | 200 HOURS | 400 HOURS |
| A | benzene | 27.4% | 27.0% | 26.6% |
| | toluene | 35.6% | 35.3% | 34.8% |
| | benzene + toluene | 63.0% | 62.3% | 61.4% |
| | yield by weight of $C_5^+$ | 71.9% | 72.3% | 73.1% |
| B | benzene | 27.8% | 27.5% | 27.2% |
| | toluene | 34.7% | 34.4% | 33.9% |
| | benzene + toluene | 62.5% | 61.9% | 61.1% |
| | yield by weight of $C_5^+$ | 70.8% | 71.0% | 71.9% |
| Q | benzene | 27.9% | 27.6% | 27.3% |
| | toluene | 35.1% | 34.8% | 34.2% |
| | benzene + toluene | 63.0% | 62.4% | 61.5% |
| | yield by weight of $C_5^+$ | 71.4% | 71.9% | 72.5% |

EXAMPLE 4

This example concerns the use of catalyst A of example 1 for the hydrocracking of a cut distilling between 330° and 510° C., obtained by hydrotreatment of a vacuum distillate (400°–550° C.) of crude oil. This cut has the following characteristics:

| | |
|---|---|
| $d_4^{15}$ | 0.870 |
| nitrogen | 5 ppm |

The reaction conditions are as follows:

| | |
|---|---|
| Temperature | 380° C. |
| Total pressure | 12 MPa |
| Velocity (vol/vol/hour) | 1 |
| Hydrogen flow rate (vol/vol of hydrocarbons) | 1000 |

The conversion to $C_1$–$C_2$ amounts to 0.30%.
The obtained effluent consists of:

| | |
|---|---|
| $C_3$ - 160° C. cut | 29.9% by weight of the feed charge |
| 160–340° C. cut | 48.3% by weight of the feed charge |
| cut boiling above 340° C. | 27.8% by weight of the feed charge. |

The 160°–340° C. fraction constitutes an excellent "Diesel" oil:

| | |
|---|---|
| "Diesel" index | 73 |
| Cloud point, lower than | 30° C. |
| Freezing point, lower than | 63° C. |

EXAMPLE 5

This example concerns the use of a catalyst according to the invention in the isomerization of saturated hydrocarbons.

A tubular reactor of stainless steel is provided with a fixed bed of 100 g of the catalyst A, prepared according to example 1 and previously roasted for one hour in air at 400° C.

The reactor is then scavenged with a dry hydrogen stream at a rate of 50 liters of hydrogen per liter of catalyst and per hour, at a temperature of 50° C. under a pressure of 0.2 MPa. After that, one liter of a solution containing 0.2 mole/liter of $AlCl_2(C_2H_5)$ in normal heptane is injected, by means of a pump, at a rate of 500 cc/h while recycling the effluent to the reactor.

After 8 hours circulation, the pump is stopped, the solvent discharged and the solid dried in hydrogen.

The analysis of the halogenated solid shows a content thereof by weight of 11.5% chlorine, 0.35% platinum, 0.43% titanium and 0.26% manganese.

The previously used tubular reactor is provided with a fixed bed of 50 cc of the so-prepared catalyst. The reactor being maintained under hydrogen circulation at 150° C. and 2 MPa, a hydrocarbon feed charge containing 50% by weight of normal pentane and 50% by weight of normal hexane, to which is added 1000 ppm by weight of carbon tetrachloride, is injected therein. The feed charge is injected at a rate of two liters per liter of catalyst and per hour while maintaining a hydrogen hourly flow rate such that the ratio hydrogen/hydrocarbons be of 3 moles/mole.

The analysis of the reactor effluent show that the latter has the following composition:

| | |
|---|---|
| iso-pentane | 28.5% by weight |
| normal pentane | 21.5% by weight |
| iso hexanes | 43.8% by weight |
| normal hexane | 6.2% by weight | so that $\dfrac{iC_5}{\Sigma C_5} = 57\%$ and $\dfrac{iC_6}{\Sigma C_6} = 87.6\%$

EXAMPLE 6

This example concerns the use of a catalyst according to the invention in the reactions of aromatic hydrocarbons isomerization.

A catalyst with an alumina base is used whose composition by weight is as follows:

Patinum: 0.4%, titanium: 0.5%, manganese: 0.3%, fluorine: 10%, the complement to 100% being alumina forming the carrier.

The catalyst is prepared as in example 1 by making use of hydrofluoric acid instead of hydrochloric acid.

The so-prepared catalyst is used for isomerizing a metaxylene charge to paraxylene.

The operating conditions were as follows:

| | |
|---|---|
| pressure | 1.2 MPa |
| temperature | 430° C. |
| hourly flow rate of liquid feed charge | 6 times the catalyst volume |
| molar ratio $H_2$/hydrocarbons | 5 |

The obtained conversion rate to paraxylene corresponds to 95.5% of the thermodynamic equilibrium with a yield by weight of xylenes amounting to 99.9%.

What is claimed is:

1. A catalyst comprising a carrier and, expressed by weight with respect to the carrier, from 0.05 to 0.6% of a noble metal of the platinum family, 0.005 to 5% of titanium, 0.005 to 3% of at least one metal selected from manganese, technetium and rhenium, and from 0.1 to 15% of halogen.

2. A catalyst according to claim 1, comprising by weight with respect to the carrier, 0.1 to 0.5% of a noble metal of the platinum family, 0.05 to 3% of titanium and 0.07 to 2% of at least one metal selected from manganese, technetium and rhenium.

3. A catalyst according to claim 1, comprising a carrier and, by weight with respect to the carrier, 0.1 to 0.5% of a noble metal of the platinum family, 0.4 to 1% of titanium and 0.2 to 0.5% of at least one metal selected from manganese, technetium and rhenium.

4. A catalyst according to claim 1, wherein the catalyst contains (a) an alumina carrier, (b) platinum or iridium, (c) titanium and (d) manganese.

5. A catalyst according to claim 1, wherein the catalyst contains (a) an alumina carrier, (b) platinum or iridium, (c) titanium and (d) rhenium.

6. A catalyst according to claim 1, wherein the active metals are platinum, titanium and manganese.

7. A catalyst according to claim 1, wherein the active metals are platinum, titanium and rhenium.

8. A catalyst according to claim 1, wherein the active metals are iridium, titanium and manganese.

9. A catalyst according to claim 1, wherein the active metals are iridium, titanium and rhenium.

10. A catalyst according to claim 1, wherein the active metals are platinum, titanium and technetium.

11. A catalyst according to claim 1, wherein the active metals are iridium, titanium and technetium.

* * * * *